United States Patent
Lee et al.

(10) Patent No.: US 7,701,886 B2
(45) Date of Patent: Apr. 20, 2010

(54) PACKET LOSS CONCEALMENT BASED ON STATISTICAL N-GRAM PREDICTIVE MODELS FOR USE IN VOICE-OVER-IP SPEECH TRANSMISSION

(75) Inventors: Minkyu Lee, Ringoes, NJ (US); Qiru Zhou, Scotch Plains, NJ (US); Imed Zitouni, White Plains, NY (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1727 days.

(21) Appl. No.: 10/856,728

(22) Filed: May 28, 2004

(65) Prior Publication Data
US 2005/0276235 A1 Dec. 15, 2005

(51) Int. Cl.
*H04Q 11/00* (2006.01)
(52) U.S. Cl. ........................... 370/270; 370/342
(58) Field of Classification Search .......... 370/270, 370/342, 335
See application file for complete search history.

(56) References Cited

U.S. PATENT DOCUMENTS

| | | | | |
|---|---|---|---|---|
| 5,255,339 | A * | 10/1993 | Fette et al. | 704/200 |
| 2002/0059060 | A1* | 5/2002 | Park | 704/201 |
| 2002/0110356 | A1* | 8/2002 | Abe et al. | 386/54 |
| 2002/0123885 | A1* | 9/2002 | Sluijter et al. | 704/201 |
| 2004/0120309 | A1* | 6/2004 | Kurittu et al. | 370/352 |
| 2005/0055209 | A1* | 3/2005 | Epstein et al. | 704/255 |
| 2005/0089003 | A1* | 4/2005 | Proctor et al. | 370/342 |
| 2006/0173677 | A1* | 8/2006 | Sato et al. | 704/223 |

OTHER PUBLICATIONS

Perkins, C., Hodson, O., Hardman, V., *A Survey of Packet Loss Recovery Techniques For Streaming Audio*, IEEE Network, Sep./Oct. 1998, pp. 40-48.
Series G: Transmission Systems And Media, Digital Systems And Networks, Digital Transmission Systems—Terminal Equipments—*Coding of Analogue Signals By pulse Code Modulation. Pulse code modulation (PCM) of voice frequencies. Appendix I: A high quality low-complexity algorithm for packet loss concealment with G.711*, International Telecommunication Union, Sep. 1999.

(Continued)

*Primary Examiner*—William J Deane
(74) *Attorney, Agent, or Firm*—Kenneth M. Brown

(57) ABSTRACT

A method for performing packet loss concealment of lost packets in Voice over IP (Internet Protocol) speech transmission. Statistical n-gram models are initially created with use of a training speech corpus, and then, packets lost during transmission are advantageously replaced based on these models. In particular, the existence of statistical patterns in successive voice over IP (VoIP) packets is advantageously exploited by first using conventional vector quantization (VQ) techniques to quantize the parameter data for each packet with use of a corresponding VQ index, and then determining statistical correlations between consecutive sequences of such VQ indices representative of the corresponding sequences of n packets. The statistic n-gram predictive models so created are then used to predict parameter data for use in representing lost data packets.

10 Claims, 2 Drawing Sheets

OTHER PUBLICATIONS

Sanneck, H., Stenger, A. K. Younes, Girod, B. *A New Technique For Audio Packet Loss Concealment*, Proceedings of IEEE Global Internet, 1996.

Cover, T.M., King, R.C., *A Convergent Gambling Estimate of The Entropy of English*, IEEE Transactions on Information Theory, vol. IT-24, No. 4, Jul. 1978, pp. 413-421.

Katz, S. M., *Estimation of Probabilities From Sparse Data For The Language Model Component of A Speech Recognizer*, IEEE Transactions on Acoustics, Speech and Signal Processing, vol. ASSP-35, No. 3, Mar. 1987, pp. 400-401.

Zitouni, I., Mari, J.F., Smaili, K., Haton, J.P., *Variable-Length Sequence Language Model For Large Vocabulary Continuous Dictation Machine: The n-gram approach*. Proceeding of EuroSpeech 99, Budapest, Hungary, pp. 1811-1814, 1999.

* cited by examiner

PACKET LOSS CONCEALMENT BASED ON STATISTICAL N-GRAM PREDICTIVE MODELS FOR USE IN VOICE-OVER-IP SPEECH TRANSMISSION

FIELD OF THE INVENTION

The present invention relates generally to the field of packet-based communication systems for speech transmission and more particularly to a packet loss concealment method for use in voice over IP (Internet Protocol) speech communication in which such lost packets are replaced based on statistical "n-gram" predictive models.

BACKGROUND OF THE INVENTION

It is well known that network environments are migrating toward a single converged IP (Internet Protocol) network that delivers voice, video and data traffic. One critical component for such a successful convergence is the transmission of voice packets over the IP network. IP networks were originally designed for transmitting data traffic that consists of relatively large-sized packets and that do not necessarily require reliable real-time delivery. In such applications, packets can be dropped, if necessary, with relative impunity in order to alleviate network congestion. In addition, subsequent packets can be harmlessly routed through different paths. As a result, each packet may experience quite different transmission delays. The resulting network characteristics are, however, very difficult, if not impossible, to predict—but they may nonetheless be perfectly acceptable for data transmission since dropped packets can simply be retransmitted, and delay jitter (i.e., variance) has a fairly insignificant effect.

Voice transmission, however, requires real-time and reliable delivery of smaller-sized packets. The receiving end needs to get a steady stream of voice packets for "playback." When a voice packet is dropped, there is no time for retransmitting the dropped packet. In addition, if one voice packet takes a longer route than the others and fails to arrive on time for playback, the received voice packet is in fact useless. In voice-over-IP (VoIP) applications, therefore, a voice packet is typically regarded as being lost whether the packet fails to arrive on time or if it fails to be delivered at all. Such problems are invariably found in all IP networks, regardless of how well managed or over-provisioned they may be—that is, such problems are not limited to the public Internet or only to "mismanaged" networks.

Various prior art techniques have been suggested and/or employed to recover or conceal the effects of lost packets. Without such efforts, even the best designed and managed IP networks would fail to deliver "toll quality" speech. In particular, many VoIP systems rely on receiver-based Packet-Loss Concealment (PLC) schemes. These may be generally classified into insertion-based, interpolation-based and regeneration-based methods.

Insertion-based PLC methods include such well-known prior art techniques as silence insertion, noise insertion and packet repetition. Silence insertion merely fills the gap (where the lost packet should have been) with silence. Although widely used, its performance is quite poor because packet loss thereby results in periods of silence, which, in turn, causes unpleasant clipped-speech distortion. Noise insertion—in which noise rather than silence is inserted in the gap where the lost packet should have been—produces slightly better voice quality and intelligibility than silence insertion. And packet repetition uses the most recently received packet to replace lost packets. Packet repetition performs the best among insertion-based methods, but still results in audible distortions in the speech signal.

Interpolation-based prior art PLC methods, such as G.711 PLC, provide higher concealment performance but do so at the expense of increased computational requirements. (G.711 is a standard communications protocol promulgated by the International Telecommunications Union Telecommunications Standardization Sector.) Another prior art interpolation-based method is the time scale modification technique, which "stretches" the good speech frame across the time gap to hide the lost packets. And finally, regeneration-based PLC methods, which are the most sophisticated of PLC techniques, produce the highest quality speech in the presence of lost packets. Imbedded PLC algorithms in CELP (Code-Excited Linear Predictive) based speech codecs (i.e., coder/decoder systems) such as the G.723.1, G.728 and G.729 standards (each also promulgated by the International Telecommunications Union Telecommunications Standardization Sector) belong to this category.

Note that each of the prior art PLC algorithms described above run at the receiving end (i.e., at the decoder). When the decoder determines that its packet receiving buffer is empty, implying that the packets which should follow the previous packets have either been lost or been delayed, it begins PLC processing. In the case of packet repetition—the most commonly used prior art PLC technique—this processing involves simply using the previous received packet. This choice is based on the assumption that speech is quasi-stationary—that is, the current missing packet will most likely possess similar characteristics to the previously received packet. However, this assumption is not always valid.

SUMMARY OF THE INVENTION

We have recognized that the fact that the entropy of a language in acoustic space is limited may be advantageously exploited to provide an improved packet loss concealment (PLC) algorithm as compared to prior art PLC techniques. In particular, and in accordance with the principles of the present invention, statistical n-gram predictive models are created in advance with use of a training speech corpus, and then, packets lost during transmission are advantageously replaced based on these models.

In accordance with one illustrative embodiment of the present invention, the existence of statistical patterns in successive voice over IP (VoIP) packets is advantageously exploited by first using conventional clustering techniques to quantize the speech parameter data for each packet with use of a corresponding quantization index, and by then determining statistical correlations between consecutive sequences of such indices representative of the corresponding sequences of n packets. (Illustratively, n may be any integer greater than or equal to 2, but more typically will be 3 or more.) The statistical n-gram (bi-gram, tri-gram, etc.) predictive models so created are then advantageously used to predict parameter data for use in representing lost data packets during VoIP speech transmission. (Note that statistical n-gram predictive models are fully familiar to those of ordinary skill in the art and are commonly used in the modeling of languages for purposes of speech recognition.)

In accordance with one illustrative embodiment of the present invention, speech utterances from a training speech corpus are first segmented into frames. For each of these frames, a set of speech parameter vectors is then extracted and the vectors from this training data are advantageously clustered into a finite number of clusters using a conventional clustering technique such as, for example, vector quantization (VQ). (Vector quantization techniques are conventional and fully familiar to those of ordinary skill in the art.) Each cluster may then be advantageously represented by its vector quantization codebook index, or its "kernel." (Note that the word "kernel" and the phrase "VQ codebook index" have identical meanings and will be used interchangeably herein.) Then, in accordance with the illustrative embodiment of the present invention, the training phase completes by constructing a set of statistical n-gram predictive models based on the sequence of kernels as encountered in the set of speech utterances from the training speech corpus.

And ultimately, during actual speech transmission (and also in accordance with the illustrative embodiment of the present invention), whenever there is a lost packet, the kernel (i.e., the VQ codebook index) of the lost packet is advantageously predicted based on the kernels associated with the n−1 previously received packets, by using the set of statistical n-gram predictive models constructed during the above-described training phase.

DETAILED DESCRIPTION OF THE PREFERRED EMBODIMENTS

Figure 1:
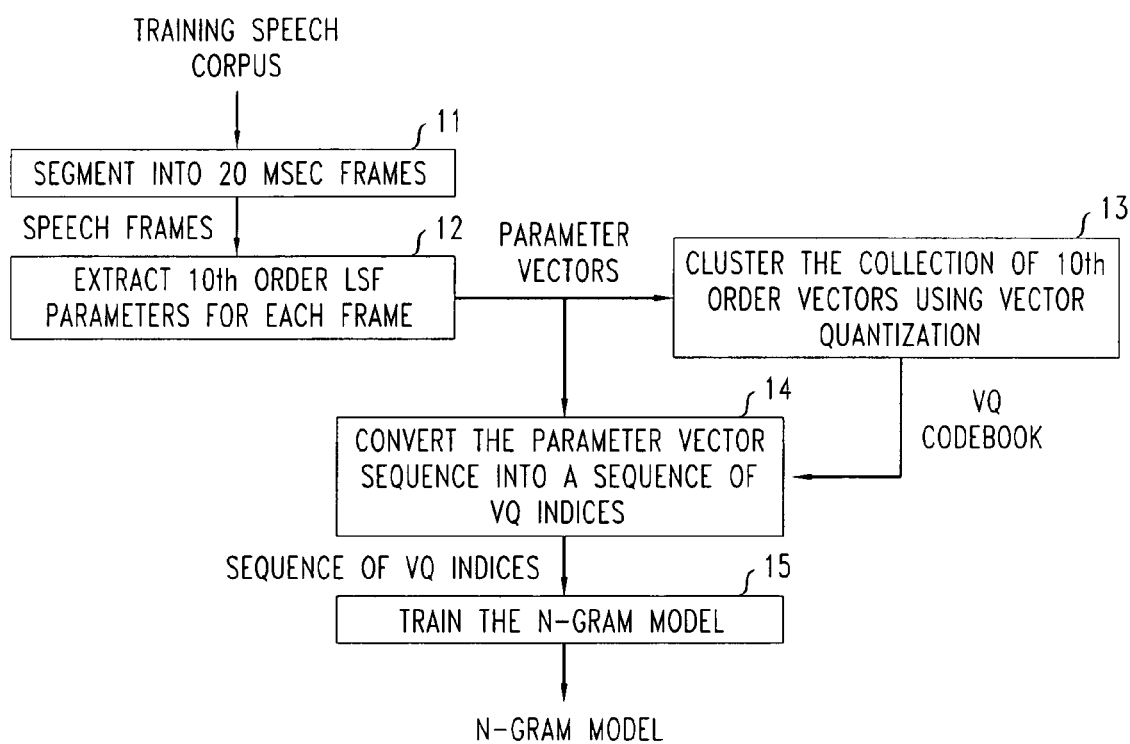
FIG. 1 shows a flowchart of a method for constructing a set of statistical n-gram models based on a training speech corpus in accordance with an illustrative embodiment of the present invention.

FIG. 1 shows a flowchart of a method for constructing a set of statistical n-gram models based on a training speech corpus in accordance with an illustrative embodiment of the present invention. The method is advantageously performed in advance of the transmission of any VoIP speech data for which it is desired to use the novel packet loss concealment (PLC) method of the present invention.

In performing the illustrative training method (i.e., method for constructing the set of statistical n-gram models based on a training speech corpus) of FIG. 1, first, as shown in block 11 of the flowchart, the speech segments extracted from the training speech corpus are segmented into frames, which may, for example, comprise 20 msec (milliseconds) of speech, thereby producing sequences of individual speech frames. Then, as shown in block 12, a set of parameters—illustratively, tenth order line spectral frequency (LSF) parameters—are extracted for each frame and are stored. The training speech corpus is advantageously as large as possible, illustratively containing 25 hours or more of speech, thereby resulting in millions of speech frames or more. Advantageously, the training speech corpus comprises example speech from many different speakers, including, for example, male voices, female voices, and children's voices, which also comprise a wide variety of speaking styles such as, for example, normal voices, breathy voices and harsh voices.

Next, after all of the frames in the training speech corpus have been processed to produce corresponding sets of parameter, the resultant collection of (tenth order) vectors are clustered using conventional Vector Quantization (VQ) clustering techniques, as is shown in block 13. This thereby produces a VQ codebook of, for example, 512 codebook indices each representative of a parameter set cluster.

At this point, as shown in block 14, the sequence of frames of the training speech corpus are advantageously re-scanned, using the sets of parameters extracted in block 12 together with the VQ codebook produced in block 13 to generate a sequence of VQ indices. Specifically, each frame's set of parameters (i.e., tenth order vector) is replaced by the VQ index representative of the VQ codebook cluster to which that set of parameters belongs. Finally, given the resultant representation of the training speech corpus as a sequence of VQ indices, a set of statistical n-gram predictive models is advantageously created with use of conventional training techniques. (For example, for each sequence of n−1 consecutive VQ codebook indices which are encountered in the training speech corpus, the number of times that each VQ codebook index immediately follows such a sequence is advantageously determined. These numbers may then be stored or, equivalently, converted to probability values by taking the appropriate ratio.)

In accordance with the above-described illustrative embodiment of the present invention, a set of n-gram predictive models may be advantageously constructed with use of the following mathematical formulation. First note that these predictive models advantageously estimate the conditional probability that a given kernel (i.e., VQ codebook index) s will follow a given "history" of n−1 precedent kernels h, denoted as p(s|h), and may be defined as follows:

$$P(s_i \mid h) = P(s_i \mid s_{i-n+1}^{i-1}). \tag{1}$$

We denote this approach a frequency n-gram model. Using the event frequency in the training data only, the conditional probability $$P(s_i \mid s_{i-n+1}^{i-1})$$

may then be advantageously estimated as follows:

$$P(s_i \mid s_{i-n+1}^{i-1}) = \frac{N(s_{i-n+1}^i)}{N(s_{i-n+1}^{i-1})}, \tag{2}$$

where N(.) denotes the frequency of the argument in the training data. Thus, in accordance with the illustrative embodiment of the present invention, statistical n-gram predictive models may be advantageously created based on event frequencies in the training data.

Note, however, that by using the illustrative approach described above, the probability of an event that does not appear in the training data N $(s_{i-n+1}^i)$ is equal to zero. Since the training corpus is unlikely to be large enough to represent the complete behavior of the source that emits packets, the estimation of unseen event probabilities using this method may be advantageously extended in accordance with an illustrative embodiment of the present invention as described below. (Note that sparseness of data is a well known generic problem of frequency statistics.)

Thus, in accordance with an illustrative embodiment of the present invention, a novel approach to estimate the probability of unseen events in the training data is employed, whereby a "back-off" method is used. (See, for example, S. M. Katz, "Estimation of Probabilities from Sparse Data for the Language Model Component of a Speech Recognizer," IEEE Transactions on Acoustic, Speech, and Signal Processing, vol. 35, no. 3, 1987, for a description of the "back-off" method as applied to Speech Recognition.) The primary idea in the back-off method is to discount unreliable probability estimates obtained from the observed frequency and to "redistribute" the "freed" probability among n-grams which never occurred in the training corpus data. In particular, using this approach, the probability of an unseen n-gram, $$s_{i-n+1}^{i-1} = s_{i-n+1}, \ldots s_{i-1},$$

may be thereby estimated as follows according to a more general context, which is the (n−1)-gram, $$s_{i-n+2}^{i-1}:$$

$$P(s_i \mid s_{i-n+1}^{i-1}) = \begin{cases} \tilde{P}(s_i \mid s_{i-n+1}^{i-1}) & \text{if } N(s_{i-n+1}^{i}) > 0, \\ \alpha(s_{i-n+1}^{i-1})P(s_i \mid s_{i-n+2}^{i-1}) & \text{otherwise} \end{cases} \quad (3)$$

where $\alpha(.)$ is a normalizing constant, and $\tilde{P}(.)$ is estimated as follows:

$$\tilde{P}(s_i \mid s_{i-n+1}^{i-1}) = d_{N(s_{i-n+1}^{i})} \frac{N(s_{i-n+1}^{i})}{N(s_{i-n+1}^{i-1})}. \quad (4)$$

Note that the term $d_{N(.)}$ denotes the Turing's discount coefficient, familiar to those skilled in the art and described, for example, in the Katz reference (cited above). The normalizing constant $\alpha$ may be advantageously derived according to the following equation:

$$\alpha(s_{i-n+1}^{i-1}) = \frac{1 - \sum_{s_i:N(s_{i-n+1}^{i})>0} \tilde{P}(s_i \mid s_{i-n+1}^{i-1})}{1 - \sum_{s_i:N(s_{i-n+1}^{i})>0} \tilde{P}(s_i \mid s_{i-n+2}^{i-1})}. \quad (5)$$

In accordance with this illustrative embodiment of the present invention, back-off n-gram models leave intact the estimate count for the probability of all unseen n-grams. Illustratively, these models also do not discount high values of counts r>k, considering them to be reliable. To accomplish this, for example, the discount coefficient $d_r$ may be advantageously set to one for r>k and may be set as follows:

$$d_r = \frac{r^*/r - (k+1)n_{k+1}/n_1}{1 - (k+1)n_{k+1}/n_1}, \quad \text{for } 1 \leq r \leq k, \quad (6)$$

where $r^* = (r+1)n_{r+1}/n_r$. The term $n_r$ in the above equation denotes the number of n-grams which occur exactly r times in the training set. The parameter k is illustratively set to a value close to or equal to 10.

Figure 2:
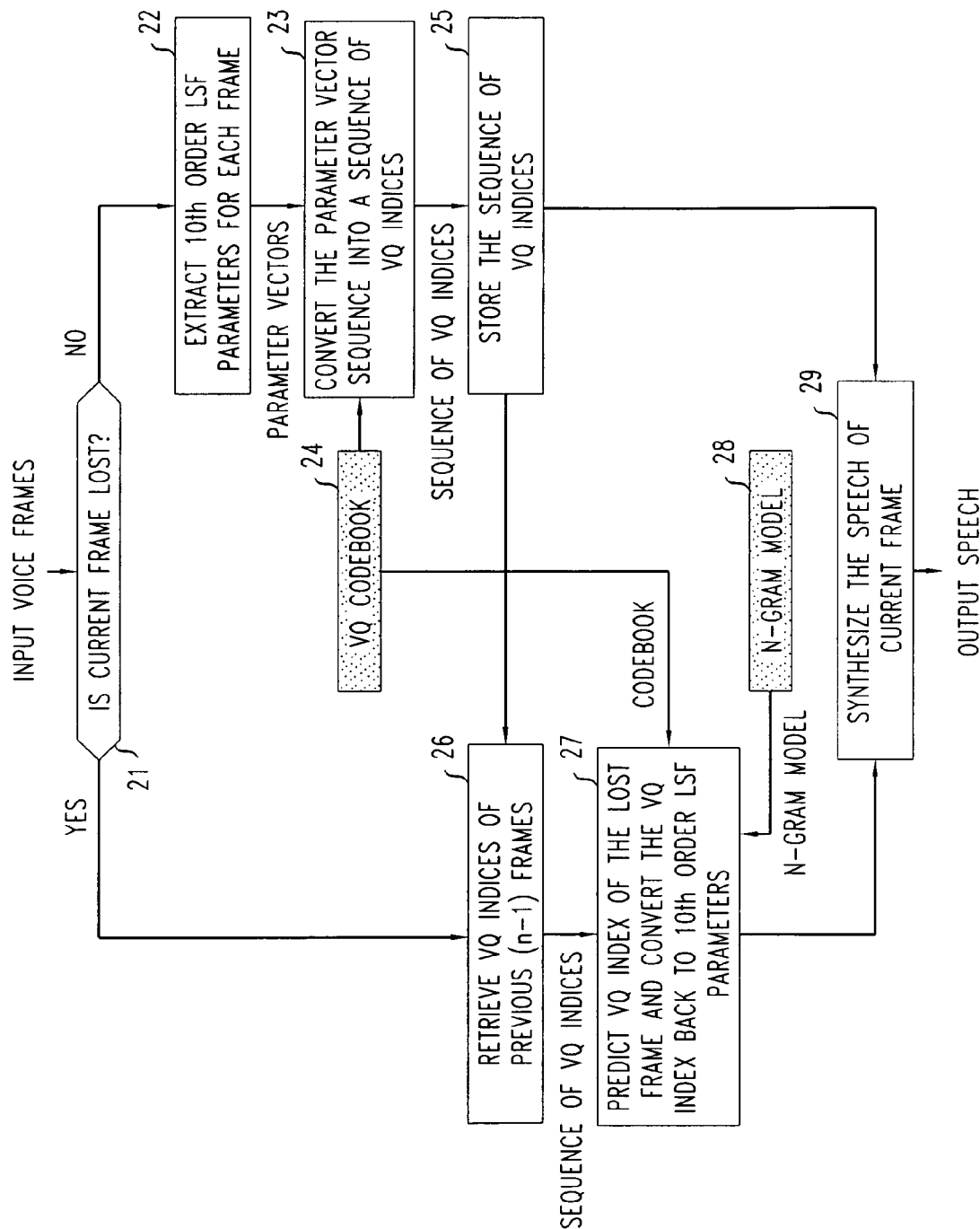
FIG. 2 shows a flowchart of a method for performing packet loss concealment (PLC) while receiving a sequence of VoIP packets, wherein the PLC method is based on a set of statistical n-gram models in accordance with an illustrative embodiment of the present invention.

FIG. 2 shows a flowchart of a method for performing packet loss concealment (PLC) while receiving a sequence of VoIP packets, wherein the PLC method is based on a set of statistical n-gram models in accordance with an illustrative embodiment of the present invention. To begin, as shown in block 21 of the flowchart, it is determined whether the current (expected) frame has been lost.

If the current frame has not been lost (i.e., the packet containing the frame has been properly received), the received packet is read in block 22, which extracts the transmitted set of parameters (e.g., the set of tenth order LSF parameters) representative of the voice signal for that frame. Then, in block 23, the resultant parameter vector sequence is converted to a sequence of corresponding VQ indices with use of a VQ codebook as shown in block 24 (which may, for example, have been advantageously derived in a training phase which may, for example, have comprised performing the illustrative training method shown in FIG. 1 and described above). Finally, as shown in block 25, the sequence of VQ indices are stored for possible later use by the PLC process, and speech representative of the received (i.e., not lost) frames is synthesized directly from the received parameters, as shown in block 29.

If, on the other hand, the current frame has been lost, a novel PLC method in accordance with the principles of the present invention is employed. In particular and in accordance with the illustrative embodiment of the present invention, packet loss concealment may be effectuated by blocks 26 through 29 as shown in FIG. 2.

More particularly, as shown in block 26, the previously stored VQ indices for the previous n−1 frames (see, for example, block 25 of the figure) are first retrieved. Then, as shown in block 27, a VQ index representative of the lost frame is advantageously determined with use of a statistical n-gram predictive model as shown in block 28 (which may, for example, have been advantageously derived in a training phase which may, for example, have comprised performing the illustrative training method shown in FIG. 1 and described above). In particular, in accordance with this illustrative embodiment of the present invention, the statistical n-gram predictive model comprises, for each possible history sequence of n−1 kernels (i.e., VQ index), a most likely-to-follow candidate kernel. It is this most likely to follow kernel that is advantageously used as the VQ codebook index representative of the lost frame.

In addition, as is also shown in block 27, the determined VQ index is advantageously converted back to a set of parameters (e.g., a set of tenth order LSF parameters) which may be advantageously used to represent the voice signal for that (lost) frame. And finally, as shown in block 29, the resultant set of parameters is advantageously used to synthesize speech representative of the lost frame.

Note that the LSF parameters of the previously received packets are quantized (i.e., a corresponding VQ codebook index is determined) using the same VQ codebook obtained during the training phase. Therefore, the resulting kernel history (i.e., the sequence of VQ codebook indices representative of the sequence of received frames) may be inserted into the statistical n-gram predictive model (also obtained during the training phase) in order to predict a kernel (i.e., VQ codebook index) to be used for determining a set of LSF parameters from which speech for the lost packet may be advantageously synthesized.

Note also that statistical n-gram models are well known and commonly used in the context of automatic speech recognition systems. Typically, they are used to estimate the likelihood (i.e., probability) of an event (e.g., n words or n phonemes) in the given language whose speech is to be recognized. In accordance with the principles of the present invention, however, estimating the likelihood of successive kernels advantageously leads to a "prediction" of one or more lost packets in a VoIP transmission environment.

Noting that a kernel represents 20 msec of speech, a trigram (i.e., 3-gram) model, for example, will analyze statistical behavior over a time period of 60 msec—note that this time period is often smaller than the duration of one phoneme. Thus, in accordance with various illustrative embodiments of the present invention, 4-gram models, 5-gram models, etc. may be advantageously employed.

In addition, in accordance with another illustrative embodiment of the present invention, "phrase" n-gram predictive models are employed, wherein kernels are first tagged into kernel phrases and n-gram models are then built on these phrases. Kernel phrases can be advantageously extracted automatically using conventional techniques familiar to those skilled in the art, and this approach allows for predictive models which comprise a large, variable length history.

In accordance with still other illustrative embodiments of the present invention, the kernel for use by a lost packet may be advantageously predicted using a function of multiple candidate kernels, rather than the single most likely-to-follow kernel. For example, in accordance with these illustrative embodiments of the present invention, the lost kernel (i.e., the kernel for the lost packet) is advantageously replaced with one derived from a predetermined number, illustratively two or three, of the best candidate kernels.

In accordance with one such other illustrative embodiment of the present invention, the parameter data for the lost packet may be defined to be the mean of the parameter data associated with the given number of best candidate kernels. Alternatively, in accordance with another one of such other illustrative embodiments of the present invention, a tree may be advantageously built wherein leafs of the tree are used to represent the LSF parameters and nodes of the tree are used to represent clusters. A kernel advantageously models each cluster, and each cluster contains all the kernels of descendent nodes. In addition, the kernel is the mean of all LSF parameter vectors that belong to its cluster. Then, in accordance with this illustrative embodiment of the present invention, the predicted kernel (i.e., the one used to represent the lost packet) will advantageously be the one that includes the given number of the best candidates.

Addendum to the Detailed Description

It should be noted that all of the preceding discussion merely illustrates the general principles of the invention. It will be appreciated that those skilled in the art will be able to devise various other arrangements, which, although not explicitly described or shown herein, embody the principles of the invention, and are included within its spirit and scope. Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. It is also intended that such equivalents include both currently known equivalents as well as equivalents developed in the future— i.e., any elements developed that perform the same function, regardless of structure.

Thus, for example, it will be appreciated by those skilled in the art that any flow charts, flow diagrams, state transition diagrams, pseudocode, and the like represent various processes which may be substantially represented in computer readable medium and so executed by a computer or processor, whether or not such computer or processor is explicitly shown. Thus, the blocks shown, for example, in such flowcharts may be understood as potentially representing physical elements, which may, for example, be expressed in the instant claims as means for specifying particular functions such as are described in the flowchart blocks. Moreover, such flowchart blocks may also be understood as representing physical signals or stored physical data, which may, for example, be comprised in such aforementioned computer readable medium such as disc or semiconductor storage devices.

We claim:

1. A method for performing packet loss concealment in a packet-based speech communication system, the method comprising the steps of:
   receiving a sequence of one or more speech packets each comprising a set of speech parameters representative of speech data;
   identifying a failure to receive a speech packet comprising a set of speech parameters representative of speech data subsequent to the speech data represented by said sets of speech parameters comprised in said received sequence of one or more speech packets;
   determining a set of replacement speech parameters based on said sets of speech parameters comprised in said received sequence of one or more speech packets and further based on a statistical model, the statistical model comprising data identifying speech data represented by said set of replacement speech parameters as being likely to follow said speech data represented by said sets of speech parameters comprised in said received sequence of one or more speech packets;
   generating speech data for each speech packet in said received sequence of one or more speech packets based on said set of speech parameters comprised therein; and
   generating speech data for said speech packet whose failure to be received was identified, based on said determined set of replacement speech parameters.

2. The method of claim 1 wherein said speech parameters comprise line spectral frequency parameters.

3. The method of claim 2 wherein said speech parameters comprise tenth order line spectral frequency parameters.

4. The method of claim 1 wherein said statistical model comprises a set of n-gram predictive models derived based on a training speech corpus.

5. The method of claim 4 wherein said statistical model is based on a Vector Quantization codebook comprising a plurality of sets of speech parameters and a corresponding Vector Quantization index associated therewith.

6. The method of claim 5 wherein each of said n-gram predictive models comprises a sequence of n−1 of said Vector Quantization indices representative of speech data comprised in a given sequence of n−1 speech packets, and one or more corresponding predicted Vector Quantization indices, wherein said one or more corresponding predicted Vector Quantization indices represent speech data which has been determined to be likely to follow said speech data comprised in said given sequence of n−1 speech packets.

7. The method of claim 6 wherein said step of determining said set of replacement speech parameters comprises
   converting each of said sets of speech parameters comprised in said received sequence of speech packets to a corresponding Vector Quantization index to thereby construct a sequence of n−1 Vector Quantization Indices based thereupon, identifying in said set of n-gram predictive models the one or more predicted Vector Quantization indices which correspond to said constructed sequence of n−1 Vector Quantization Indices, and determining said set of replacement speech parameters based upon said one or more identified predicted Vector Quantization indices.

8. The method of claim 7 wherein said set of replacement speech parameters is determined by identifying the predicted Vector Quantization index which corresponds to said constructed sequence of n−1 Vector Quantization Indices and which represents speech data which has been determined to be most likely to follow said speech data comprised in said given sequence of n−1 speech packets.

9. The method of claim 7 wherein said set of replacement speech parameters is determined by identifying a plural number γ of more predicted Vector Quantization indices which correspond to said constructed sequence of n−1 Vector Quantization Indices, where the plural number γ comprises the perplexity of said statistical model, and by deriving said set of replacement speech parameters based upon a combination of said γ predicted Vector Quantization indices.

10. The method of claim 9 wherein said set of replacement speech parameters is derived by calculating mean values of said speech parameters in said plural number γ of sets of speech parameters associated with said γ predicted Vector Quantization indices.

* * * * *